(12) United States Patent
Belotserkovsky (10) Patent No.: US 8,983,004 B2
(45) Date of Patent: Mar. 17, 2015

(54) BLIND CARRIER TRACKING LOOP

(75) Inventor: Maxim Belotserkovsky, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 785 days.

(21) Appl. No.: 12/735,369

(22) PCT Filed: Jan. 14, 2008

(86) PCT No.: PCT/US2008/000477
§ 371 (c)(1),
(2), (4) Date: Jul. 9, 2010

(87) PCT Pub. No.: WO2009/091357
PCT Pub. Date: Jul. 23, 2009

(65) Prior Publication Data
US 2010/0284494 A1 Nov. 11, 2010

(51) Int. Cl.
*H03D 3/24* (2006.01)
*H04L 27/00* (2006.01)
*H04L 7/033* (2006.01)

(52) U.S. Cl.
CPC ........... *H04L 27/0014* (2013.01); *H04L 7/033* (2013.01); *H04L 2027/0024* (2013.01); *H04L 2027/0044* (2013.01); *H04L 2027/0069* (2013.01)
USPC .......................................... 375/327; 375/326

(58) Field of Classification Search
USPC .................... 375/326–327, 373, 375
See application file for complete search history.

(56) References Cited

U.S. PATENT DOCUMENTS

| 4,720,688 | A * | 1/1988 | Hasegawa et al. | 331/2 |
| 5,799,037 | A * | 8/1998 | Strolle et al. | 375/233 |
| 6,198,780 | B1 * | 3/2001 | Kang | 375/321 |
| 6,233,295 | B1 | 5/2001 | Wang | |
| 7,643,577 | B2 * | 1/2010 | Lee | 375/321 |
| 2007/0088515 | A1 * | 4/2007 | Kim | 702/79 |
| 2008/0240221 | A1 * | 10/2008 | Morris | 375/232 |

FOREIGN PATENT DOCUMENTS

| WO | WO9813929 | 4/1998 |
| WO | WO2004049704 | 6/2004 |
| WO | WO2004049706 | 6/2004 |

OTHER PUBLICATIONS

"ATSC Digital Television Standard (A/53) Revision E, with Amendments No. 1 and 2", Advanced Television Systems Committee, Doc. A/53E, Washington, DC, Dec. 27, 2005.
"Recommended Practice: Guide to the Use of the ATSC Digital Television Standard", Advanced Television Systems Committee, Doc. A/54A, Washington, DC, Dec. 4, 2003.
Search Report Dated Nov. 21, 2008.

* cited by examiner

*Primary Examiner* — Vineeta Panwalkar
*Assistant Examiner* — Janice Tieu
(74) *Attorney, Agent, or Firm* — Robert D. Shedd; Joseph J. Opalach (57) ABSTRACT

A receiver is an ATSC (Advanced Television Systems Committee)-receiver and comprises a phase lock loop (PLL) for performing carrier tracking of a carrier in a received signal. The PLL includes a detector (160) comprising two pseudo-Hilbert filters (205, 215). The detector uses energy from both band edges of the received ATSC signal for driving the PLL.

15 Claims, 11 Drawing Sheets

*Prior Art*

BLIND CARRIER TRACKING LOOP

This application claims the benefit, under 35 U.S.C. §365 of International Application PCT/US2008/000477, filed Jan. 14, 2008, which was published in accordance with PCT Article 21(2) on Jul. 23, 2009 in English.

BACKGROUND OF THE INVENTION

The present invention generally relates to communications systems and, more particularly, to a receiver.

Figure 1:
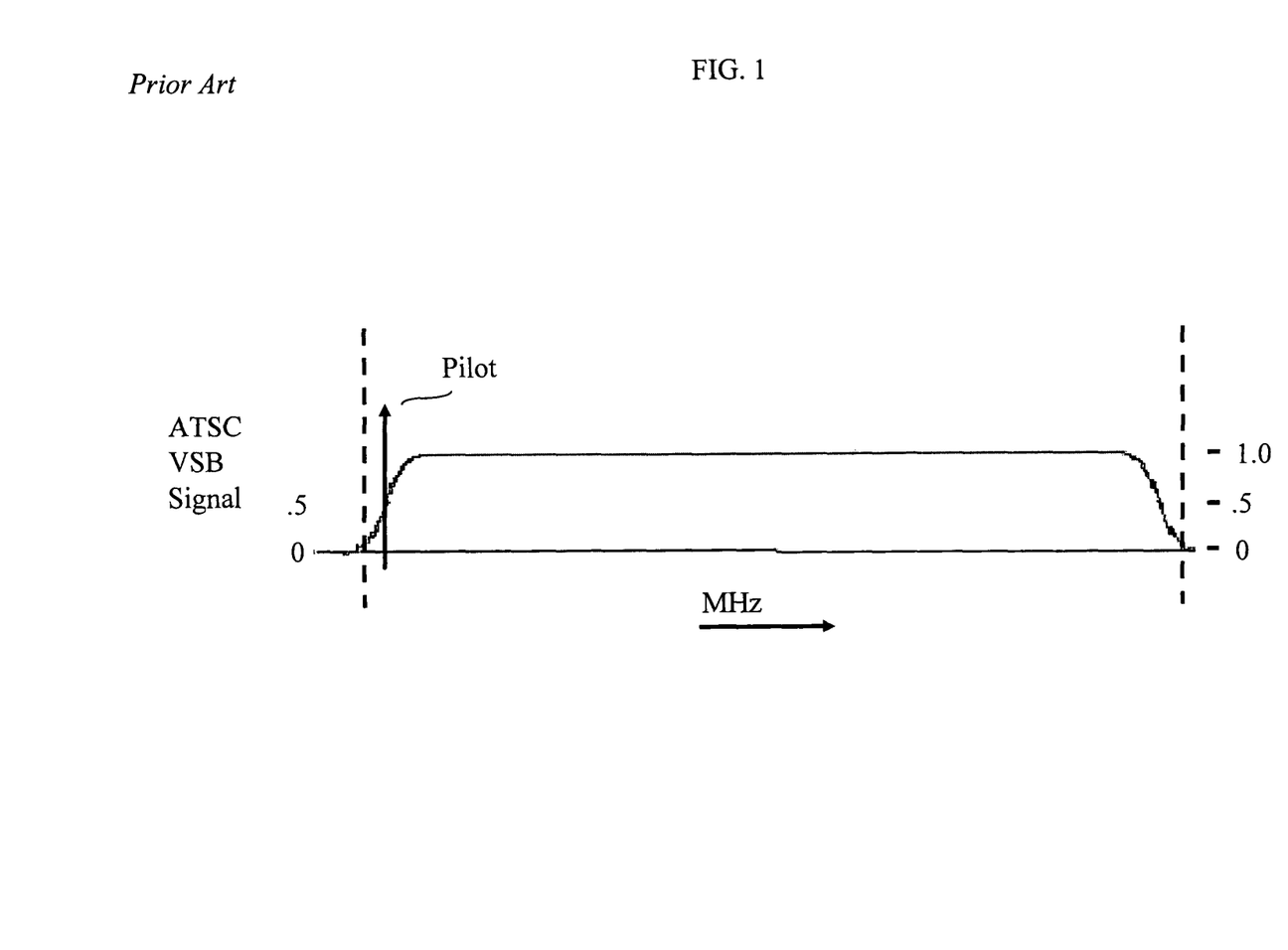
FIG. 1 shows an illustrative ATSC VSB signal spectrum.

In the ATSC (Advanced Television Systems Committee) standard for digital terrestrial television (DTV) in the United States (e.g., see, United States Advanced Television Systems Committee, "ATSC Digital Television Standard", Document A/53, Sep. 16, 1995), the modulation system consists of a suppressed carrier vestigial sideband (VSB) modulation with an added small in-phase pilot at the suppressed carrier frequency, 11.3 dB below the average signal power, at the lower VSB signal edge. An illustrative spectrum for an ATSC VSB signal is shown in FIG. 1.

A typical ATSC-VSB receiver includes a carrier tracking loop (CTL) that processes a received ATSC VSB signal to both remove any frequency offsets between the local oscillator (LO) of the transmitter and LO of the receiver and to demodulate the received ATSC VSB signal down to baseband from an intermediate frequency (IF) or near baseband frequency (e.g., see, United States Advanced Television Systems Committee, "Guide to the Use of the ATSC Digital Television Standard", Document A/54, Oct. 4, 1995; and U.S. Pat. No. 6,233,295 issued May 15, 2001 to Wang, entitled "Segment Sync Recovery Network for an HDTV Receiver"). In this regard, the CTL performs carrier phase estimation.

One category of methods for performing carrier phase estimation in an ATSC-receiver is referred to as "blind" or non-data aided. Blind methods rely on either the ATSC pilot, or on a pseudo-pilot created by subjecting the lower VSB signal edge to some form of processing such as squaring. Unfortunately, the main problem with using a blind approach is that under certain transmission channel conditions, such as ghosting, the lower band edge of the ASTC VSB signal is either completely destroyed or distorted in such a way as to make it impossible to extract the desired carrier offset information.

Another category of methods for performing carrier phase estimation in an ATSC-receiver is referred to as "non-blind" or data aided. Data aided methods rely on (partial) knowledge of the information (symbols, bits) being transmitted. However, a data aided approach, especially in the ATSC context, generally can't be used by itself and, instead, is used in an auxiliary capacity to, e.g., maintain carrier lock once it has been acquired through the use of a blind method.

SUMMARY OF THE INVENTION

As noted above, traditional blind methods fail when performing carrier acquisition/tracking under many of the severe channel distortion (ghosting) conditions. However, I have realized that it is still possible to successfully perform blind carrier acquisition/tracking even under many of the severe channel distortion (ghosting) conditions. In particular, and in accordance with the principles of the invention, a receiver comprises a phase lock loop for performing carrier tracking, wherein the phase lock loop comprises a detector for using energy from both band edges of a received signal for driving the phase lock loop.

In an embodiment of the invention, the receiver is an ATSC-receiver and comprises a phase lock loop (PLL), which includes a detector comprising two pseudo-Hilbert filters. The detector uses energy from both band edges of the received ATSC signal for driving the PLL.

In view of the above, and as will be apparent from reading the detailed description, other embodiments and features are also possible and fall within the principles of the invention.

BRIEF DESCRIPTION OF THE DRAWINGS

FIGS. 8-10 additional figures for use in understanding the operation of the detector of FIG. 5 in accordance with the principles of the invention; and.

DETAILED DESCRIPTION

Other than the inventive concept, the elements shown in the figures are well known and will not be described in detail. Also, familiarity with television broadcasting, receivers and video encoding is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire) and ATSC (Advanced Television Systems Committee) (ATSC) is assumed. Further information on ATSC broadcast signals can be found in the following ATSC standards: Digital Television Standard (A/53), Revision C, including Amendment No. 1 and Corrigendum No. 1, Doc. A/53C; and *Recommended Practice: Guide to the Use of the ATSC Digital Television Standard* (A/54). Likewise, other than the inventive concept, transmission concepts such as eight-level vestigial sideband (8-VSB), Quadrature Amplitude Modulation (QAM), orthogonal frequency division multiplexing (OFDM) or coded OFDM (COFDM)), and receiver components such as a radio-frequency (RF) front-end, receiver section, low noise block, tuners, demodulators, Hilbert filters, carrier tracking loop, correlators, leak integrators and squarers, etc., is assumed. Similarly, other than the inventive concept, formatting and encoding methods (such as Moving Picture Expert Group (MPEG)-2 Systems Standard (ISO/IEC 13818-1)) for generating transport bit streams are well-known and not described herein. Also, those skilled in the art appreciate that carrier recovery involves processing in the real and the complex domains. It should also be noted that the inventive concept may be implemented using conventional programming techniques, which, as such, will not be described herein. Finally, like-numbers on the figures represent similar elements.

Figure 2:
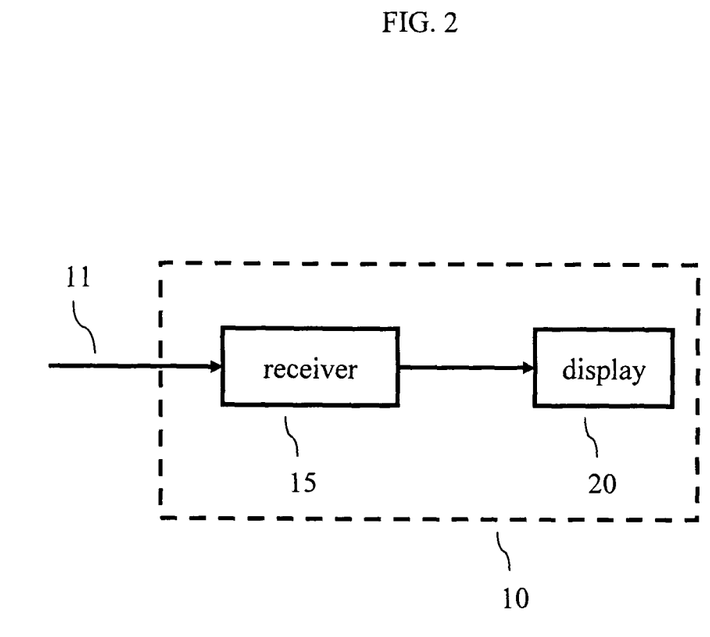
FIG. 2 shows an illustrative high-level block diagram of an apparatus embodying the principles of the invention.

A high-level block diagram of an illustrative apparatus 10 in accordance with the principles of the invention is shown in FIG. 2. Apparatus 10 includes a receiver 15 and a display 20. Illustratively, receiver 15 is an ATSC-compatible receiver. It should be noted that receiver 15 may also be NTSC (National Television Systems Committee)-compatible, i.e., have an NTSC mode of operation and an ATSC mode of operation such that apparatus 10 is capable of displaying video content from an NTSC broadcast or an ATSC broadcast. For simplicity in describing the inventive concept, only the ATSC mode of operation is described herein. Receiver 15 receives a broadcast signal 11 (e.g., via an antenna (not shown)) for processing to recover therefrom, e.g., an HDTV (high definition TV) video signal for application to display 20 for viewing video content thereon. As noted earlier, an illustrative spectrum for an ATSC VSB signal is shown in FIG. 1.

Figure 3:
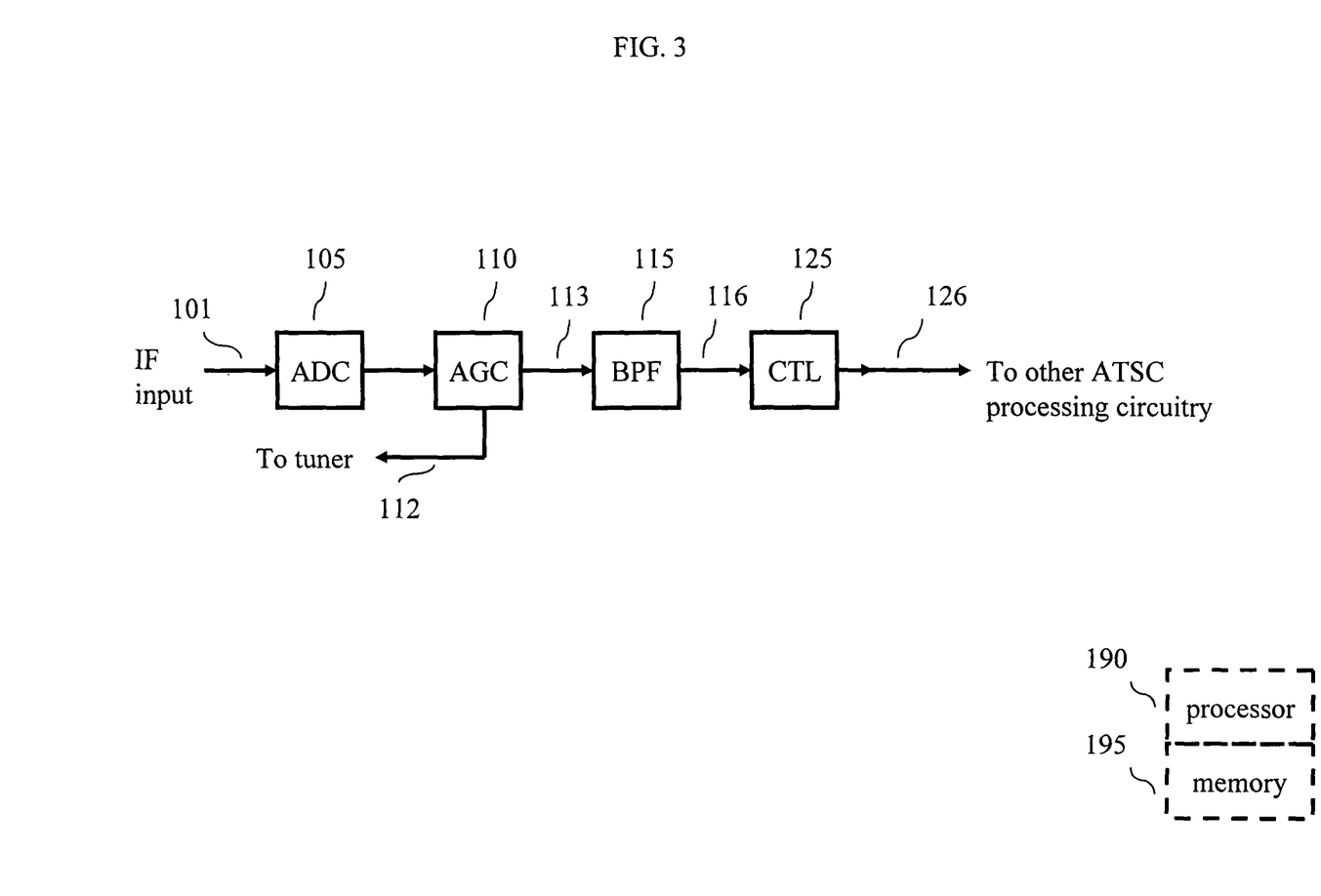
FIG. 3 shows a portion of a receiver embodying the principles of the invention.

Turning now to FIG. 3, that relevant portion of receiver 15 in accordance with the principles of the invention is shown. In particular, receiver 15 includes analog-to-digital converter (ADC) 105, automatic gain control (AGC) 110, band-pass filter (BPF) 115 and carrier and tracking loop (CTL) 125, which operates in accordance with the principles of the invention. Receiver 15 is a processor-based system and includes one, or more, processors and associated memory as represented by processor 190 and memory 195 shown in the form of dashed boxes in FIG. 3. In this context, computer programs, or software, are stored in memory 195 for execution by processor 190. The latter is representative of one, or more, stored-program control processors and these do not have to be dedicated to the receiver function, e.g., processor 190 may also control other functions of receiver 15 (or apparatus 10). Memory 195 is representative of any storage device, e.g., random-access memory (RAM), read-only memory (ROM), etc.; may be internal and/or external to receiver 15; and is volatile and/or non-volatile as necessary.

Input signal 101 represents a digital VSB modulated signal in accordance with the above-mentioned "ATSC Digital Television Standard" and is centered at a specific IF (Intermediate Frequency) of $F_{IF}$ Hertz (provided by a tuner (not shown)). Input signal 101 is sampled by ADC 105 for conversion to a sampled signal, which is then gain controlled by AGC 110. The latter is noncoherent and is a mixed mode (analog and digital) loop that provides a first level of gain control (prior to carrier tracking), symbol timing and sync detection of the VSB signal included within signal 101. AGC 110 basically compares the absolute values of the sampled signal from ADC 105 against a predetermined threshold, accumulates the error and feeds that information, via signal 112, back to the tuner (not shown) for gain control prior to ADC 105. As such, AGC 110 provides a gain controlled signal 113 to BPF 115, which is centered at the IF frequency ($F_{IF}$) and has a bandwidth equal to 6 MHz (millions of hertz). The output signal 116 from BPF 115 is then passed through CTL 125, which is a phase locked loop that processes signal 116 in accordance with the principles of the invention to down convert the IF signal to baseband and correct for frequency offsets between the transmitter (not shown) of the broadcast ATSC video carrier and the receiver tuner Local Oscillator (not shown). CTL 125 provides a down-converted received signal 126. The latter is provided to other portions (not shown) of receiver 15 for recovery of the data conveyed therein.

Figure 4:
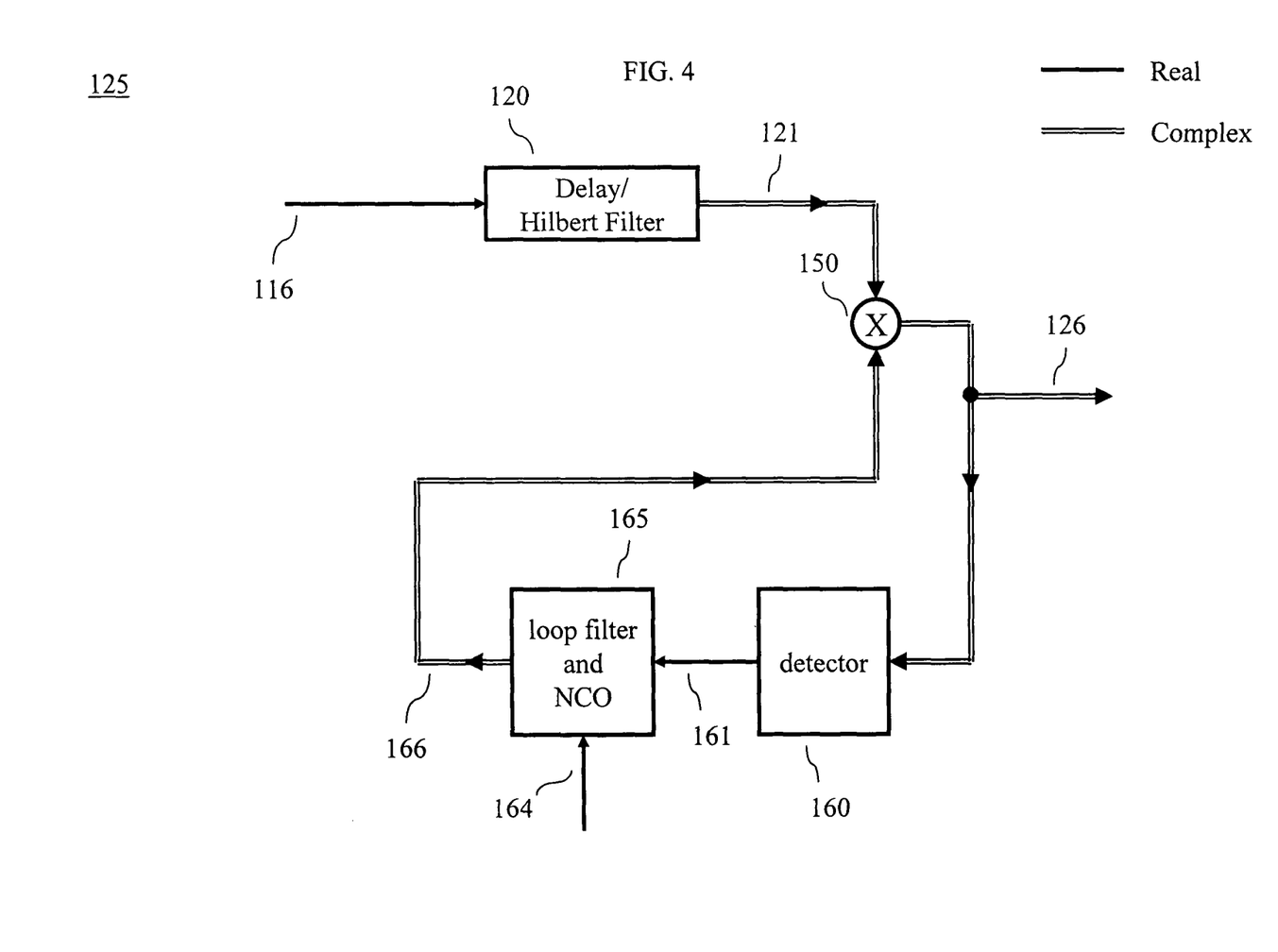
FIG. 4 shows an illustrative carrier tracking loop embodying the principles of the invention for use in the receiver of FIG. 3.

Reference should now be made to FIG. 4, which shows an illustrative embodiment of CTL 125 in accordance with the principles of the invention. CTL 125 includes delay/Hilbert filter element 120, multiplier 150, detector 160 and loop filter and numerically controlled oscillator (NCO) 165.

Delay/Hilbert filter element 120 includes a Hilbert filter and an equivalent delay line that matches the Hilbert filter processing delay. As known in the art, a Hilbert Filter is an all-pass filter that introduces a −90° phase shift to all input frequencies greater than 0 (and a +90° degree phase shift to negative frequencies). The Hilbert filter allows recovery of the quadrature component of the output signal 116 from BPF 115. In order for the CTL to correct the phase and lock to the ATSC IF carrier both the in-phase and quadrature components of the signal are needed.

The output signal 121 from delay/Hilbert filter element 120 is a complex sample stream comprising in-phase (I) and quadrature (Q) components. It should be noted that complex signal paths are shown as double lines in the figures. Multiplier 150 receives output signal 121 and performs de-rotation of the sample stream by a calculated phase angle. In particular, the in-phase and quadrature components of signal 121 are rotated by a phase. This phase is provided by signal 166, which represents particular sine and cosine values provided by Loop filter and NCO 165. The latter comprises, e.g., a loop filter, NCO and a sin/cos table as known in the art. Ignoring for the moment detector 160, loop filter and NCO receive a fixed frequency via signal 164 for downcoverting the received signal from IF to near-baseband. Detector 160 then corrects for the residual difference. The output signal from multiplier 150, and for that matter CTL 125, is down-converted received signal 126, which represents a de-rotated complex sample stream. As can be observed from FIG. 4, down-converted received signal 126 is also applied to detector 160, which, and in accordance with the principles of the invention, uses energy from both band edges of the received ATSC signal for driving the PLL as represented by loop filter and NCO 165.

Figure 5:
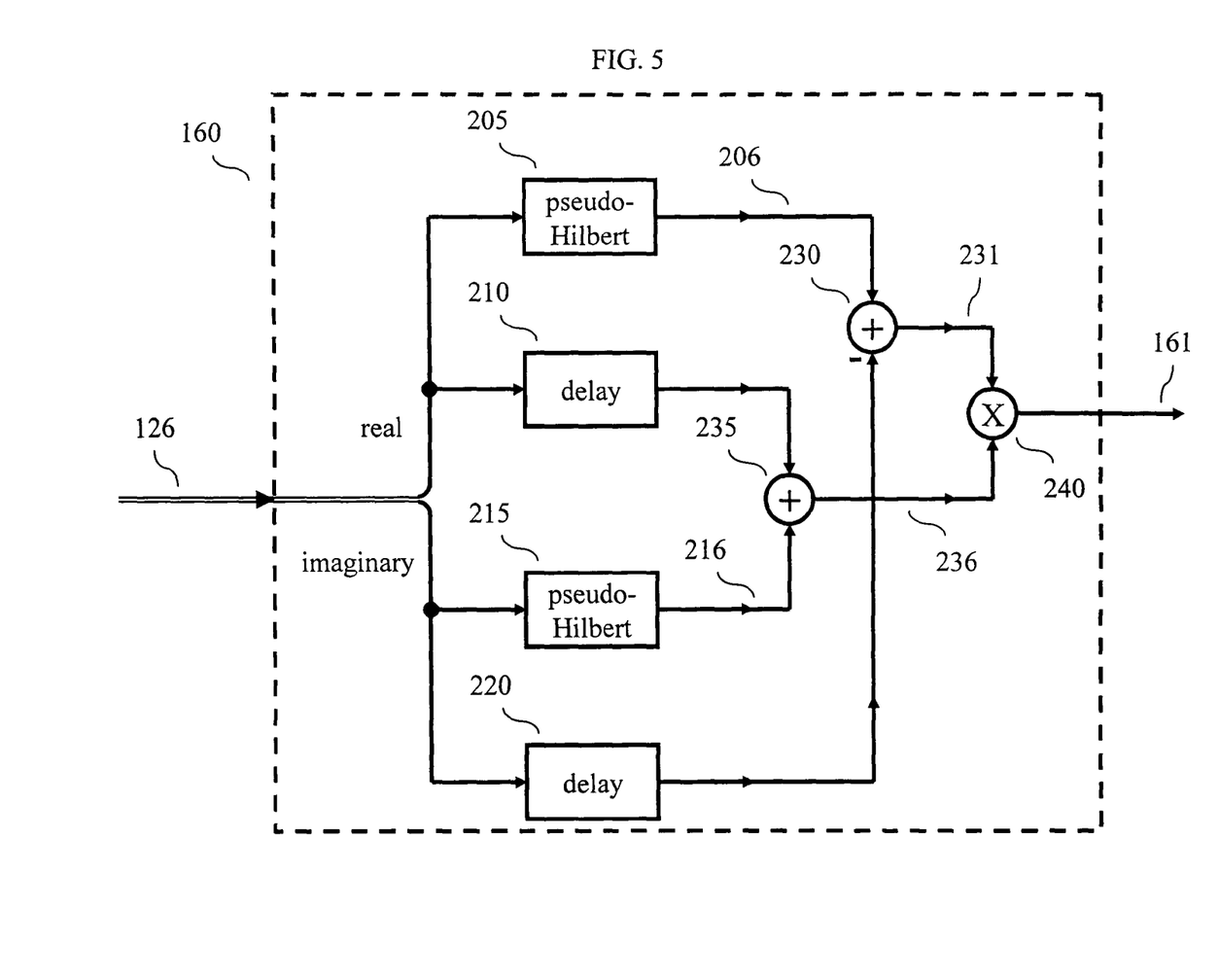
FIG. 5 shows an embodiment of a detector in accordance with the principles of the invention.

An illustrative embodiment of detector 160 is shown in FIG. 5. Detector 160 comprises delay elements 210 and 220, pseudo-Hilbert filters 205 and 215, combiners 230 and 235 and multiplier 240. The down-converted received signal 126 is applied to delay elements 210 and 220 along with pseudo-Hilbert filters 205 and 215. The delay elements 210 and 220 provide matching delays while the associated pseudo-Hilbert filters process the respective components of signal 126. In that regard, the upper signal processing path, represented by delay element 210 and pseudo-Hilbert filter 205 are associated with the real component of signal 126; while the lower signal processing path, represented by delay element 220 and pseudo-Hilbert filter 215 are associated with the imaginary component of the signal 126.

Figure 6:
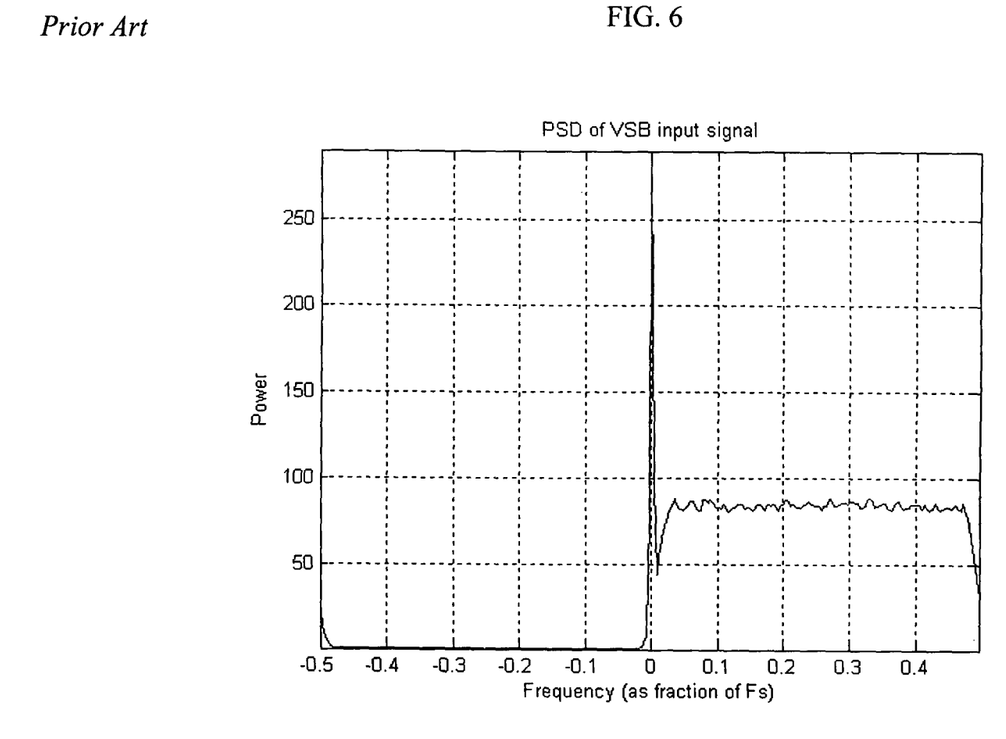
FIG. 6 shows a power spectral density of an ATSC VSB signal.
Figure 7:
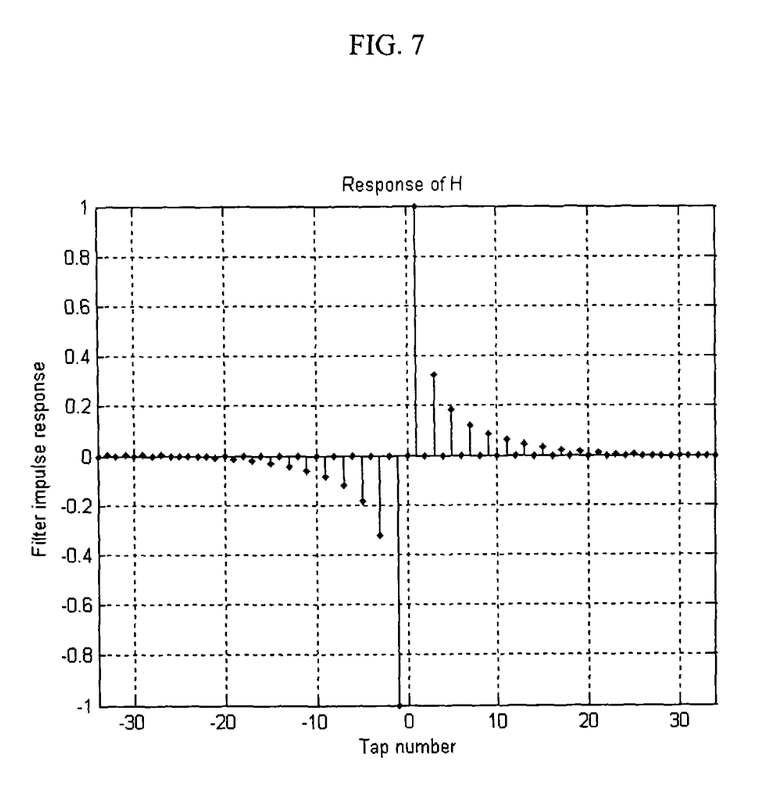
FIG. 7 illustrates a pseudo-Hilbert filter response for use in the detector of FIG. 5 in accordance with the principles of the invention.

As described herein, a "pseudo-Hilbert" filter is not a "true" Hilbert (which is a mathematical abstraction). It is, in fact, the same filter as the one that can be used at an ATSC VSB transmitter as known in the art to generate the imaginary part of the complex base-band VSB signal. Turning briefly to FIG. 6, the power spectral density (PSD) plot of an illustrative raised-cosine-shaped VSB signal is shown. The y-axis is the power and the x-axis is the frequency, which is expressed as a fraction of the sampling frequency ($F_s$). In this regard, an exemplary ATSC pseudo-Hilbert filter response for use in filters 205 and 215 for processing the respective components of signal 126 is shown in FIG. 7. Each filter 205 and 215 comprises a number of taps (not shown in FIG. 5). The y-axis is the filter impulse response and the x-axis is the tap number of the filter. Returning to FIG. 5, pseudo-Hilbert filter 205 generates a signal 206 from the real component of input signal 126; and pseudo-Hilbert filter 215 generates a signal 216 from the imaginary component of input signal 126. Combiner 230 provides signal 231, which represents a difference between the signal 206 and the delayed imaginary component of signal 126. Combiner 235 provides signal 236, which represents the sum of the signal 216 and the delayed real component of signal 126. Multiplier 240 multiplies signals 231 and 236 to provide signal 161, which drives loop filter and NCO 165.

The operation of detector 160 can be understood intuitively in the following way. First define a received signal, denoted as "Signal 1":

$$\text{Signal 1} = (d*(1+j\cdot h)*(C_{re}+j\cdot C_{im}))\cdot e^{j\cdot \phi} \quad (1)$$

where j is imaginary "1"; h is a pseudo-Hilbert filter; d is the transmitted (real) symbol sequence; $C_{re}$ and $C_{im}$ are the real and imaginary components of the transmission channel; "*" denotes convolution; $\phi$ is the sought carrier phase offset and e is the complex exponent. It should be noted that in the case of a flat (Gaussian) channel, $(C_{re}+j\ C_{im})$ is identically "1". With the received signal (e.g., signal 126) defined as in equation (1), it can be shown that the output signal of detector 160—denoted as "Signal 2"—can be represented as the product of the real and imaginary components of the following complex signal:

$$\text{Signal 2} = j\cdot(d*(1+h*h)*(C_{re}+j\cdot C_{im}))\cdot e^{j\cdot \phi} \quad (2)$$

In the context of FIG. 5, the combination of pseudo-Hilbert filter 205 and delay element 220 generate the imaginary part of signal 2 (signal 231 in FIG. 5); while the combination of delay element 210 and pseudo-Hilbert filter 215 form the real part of signal 2 (signal 236 in FIG. 5). The product of the real part of signal 2 (signal 236) and the imaginary part of signal 2 (signal 231) is provided by multiplier 240 (signal 161) for driving loop filter and NCO 165.

Figure 8:
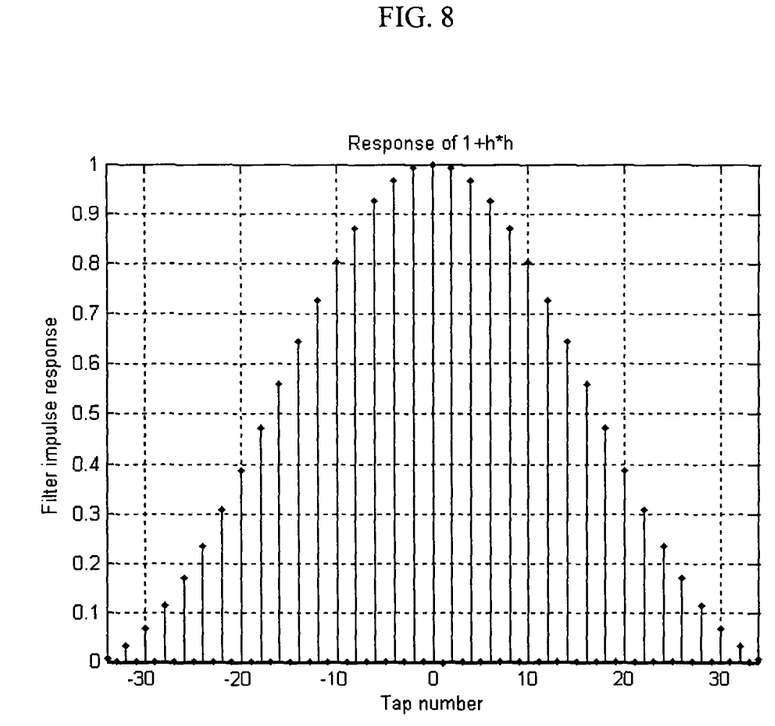
Figure 9:
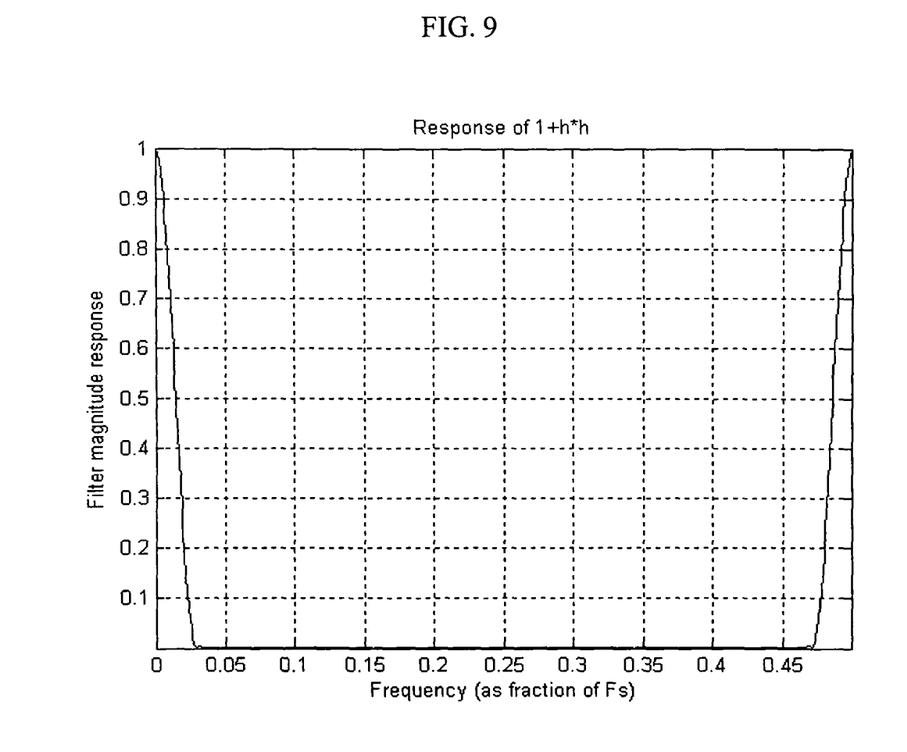
Figure 10:
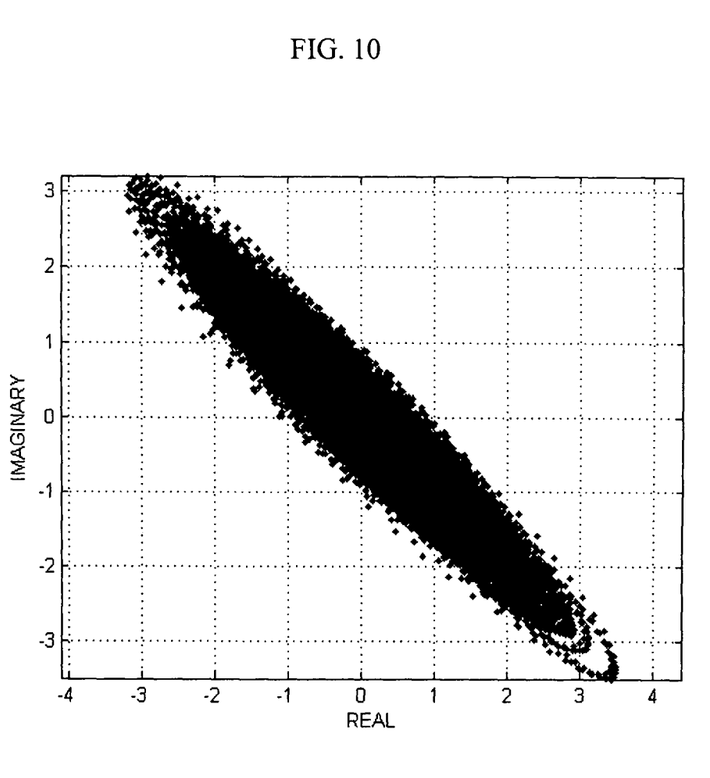

With respect to equation (2), an exemplary (1+h*h) filter impulse response is shown in FIG. 8 with the corresponding frequency response shown in FIG. 9. It can be observed that the (1+h*h) filter, in essence, extracts the energy of both band edges of the received VSB signal such that the convolution of that filter and the transmitted sequence "d" has the power spectrum that has the shape of the filter shown in FIG. 9. This resulting signal strictly real and contains the energy of both signal band edges. In order for the product of the real and imaginary components of signal 2 to contain information about the sought phase $\phi$, the complex signal $(d*(1+h*h)*(C_{re}+j\cdot C_{im}))$ has to exhibit some correlation between its two components. This is illustrated in FIG. 10, where the "cloud" of complex points has elongated shape indicative of correlation between the real and the imaginary components. Such correlation, in turn, requires that, in the case of a 0 dB ghost at 90° (the most challenging case), the ghost delay be less than half the length of the response of filter (1+h*h) (which is roughly 30 for the exemplary response shown in FIG. 8). Also, for this exemplary response, the delay must not equal an odd number of samples (because every other tap of the filter is "zero", thus making the real and imaginary components at any given time uncorrelated). In all other cases (e.g., all channels with $C_{im} \equiv 0$), the "cloud" will have a shape other than circular, which will allow for the phase information to be extracted from it by multiplying the real component (signal 236) and the imaginary component (signal 231) and then averaging the result in the loop filter.

To further illustrate the operation of detector 160, consider the simple case when the transmission channel induces no distortion, so that $C_{im}$ is identically "zero" and $C_{re}$ is identically "one". In this case, the time-average detector output value for signal 161 of detector 160 is a signal expressed as:

$$\frac{1}{2}(a^2)\sin(2\varphi) \quad (3)$$

where $(a^2)$ is the average power of signal $(d*(1+h*h))$. In this case, it can be observed that the average output is a function of twice the carrier phase error, which is used to drive the PLL as represented by loop filter and NCO 165 (the average detector output is zero when $\phi=0$).

Figure 11:
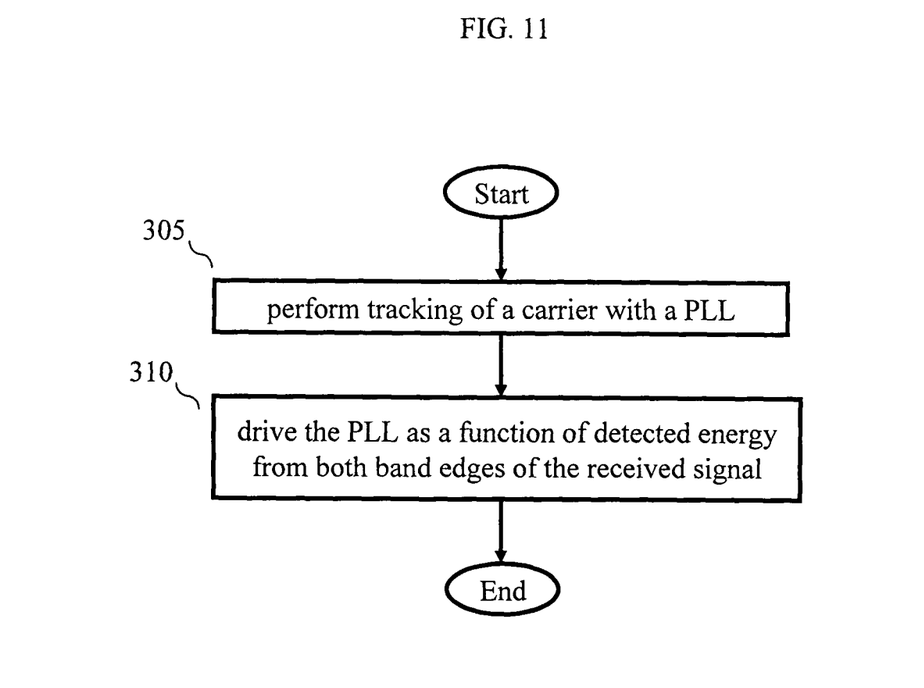
FIG. 11 shows an illustrative method in accordance with the principles of the invention.

Turning now to FIG. 11, an illustrative flow chart in accordance with the principles of the invention is shown. In step 305, receiver 15 performs tracking of a carrier of a received signal with a PLL. In step 310, receiver 15 drives the PLL as a function of detected energy from both band edges of the received signal.

As described above, the inventive concept describes a carrier (local oscillator) phase and frequency offset detection method and apparatus that can perform even under many of the severe channel distortion (ghosting) conditions. The robustness of detector 160 lies in its unique ability to simultaneously use the energy of both band edges of the VSB signal. As such, in most situations, the inventive concept allows the carrier offset to be acquired independent of any symbol timing recovery. Indeed, even if, e.g., the lower (pilot) band-edge energy of the received VSB signal is completely destroyed by the channel multi-path (extremely severe ghosting conditions), detector 160 still allows the carrier offset to be acquired if the symbol-timing (STR) of the receiver is locked and stationary.

It should also be noted that groupings of components for particular elements described and shown herein are merely illustrative. For example, although FIG. 2 shows a display 20 internal to apparatus 10 (such as in a television (TV) set), this is not required and, e.g., display 20 could be external to apparatus 10 and, indeed, located further away. For example, apparatus 10 could be a set-top box or server which further distributes a signal for viewing on display 20.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one, or more, integrated circuits (ICs). Similarly, although shown as separate elements, any or all of the elements (e.g., of FIGS. 3, 4 and 5) may be implemented in a stored-program-controlled processor, e.g., a digital signal processor, which executes associated software, e.g., corresponding to one, or more, of the steps shown in, e.g., FIG. 11. Further, the principles of the invention are applicable to other types of communications systems, e.g., satellite, Wireless-Fidelity (Wi-Fi), cellular, etc. Indeed, the inventive concept is also applicable to stationary or mobile receivers. It is therefore to be understood that numerous modifications may be made to the illustrative embodiments and that other arrangements may be devised without departing from the spirit and scope of the present invention as defined by the appended claims.

The invention claimed is:

1. Apparatus for use in a carrier tracking loop, the apparatus comprising:
a phase lock loop configured to perform blind tracking of a carrier in a received signal;

wherein the phase lock loop comprises
a detector configured to use energy from both band edges of the received signal to drive the phase lock loop; wherein the detector comprises at least two Hilbert-type filters and at least two delay elements, together configured to detect energy from both band edges of the received signal.

2. The apparatus of claim 1, wherein the phase lock loop is configured to provide a downconverted received signal.

3. The apparatus of claim 1, wherein the at least two Hilbert-type filters are pseudo-Hilbert filters.

4. The apparatus of claim 1, wherein the detector comprises:
a first Hilbert-type filter of the at least two Hilbert-type filters responsive to a real component of an output signal of the carrier tracking loop to provide a first signal;
a second Hilbert-type filter of the at least two Hilbert-type filters responsive to an imaginary component of an output signal of the carrier tracking loop to provide a second signal;
a first delay element of the at least two delay elements configured to delay the real component of the output signal of the carrier tracking loop to provide a delayed real component;
a second delay element of the at least two delay elements configured to delay the imaginary component of the output signal of the carrier tracking loop to provide a delayed imaginary component; and
a first combiner configured to provide a difference signal representative of a difference between the first signal and the delayed imaginary component;
a second combiner configured to provide a sum signal representative of a sum of the delayed real component and the second signal; and
a multiplier configured to multiply the difference signal and the sum signal for providing an output signal for driving the phase lock loop.

5. The apparatus of claim 4, wherein the first and second Hilbert-type filters are pseudo-Hilbert filters.

6. The apparatus of claim 1, wherein the received signal is an ATSC (Advanced Television Systems Committee) VSB (Vestigial Sideband) modulation signal and the phase lock loop is configured to downconvert the received ATSC VSB modulation signal.

7. A method for use in a carrier tracking loop, the method comprising:
performing blind tracking of a carrier in a received signal with a phase lock loop; and
driving the phase lock loop as a function of detected energy from both band edges of the received signal; wherein the driving step includes using at least two Hilbert-type filters and at least two delay elements, together for detecting energy from both band edges of the received signal.

8. The method of claim 7, further comprising providing a downconverted received signal.

9. The method of claim 7, wherein the at least two Hilbert-type filters are pseudo-Hilbert filters.

10. The method of claim 7, wherein the driving step comprises:
processing a real component of an output signal of the carrier tracking loop for providing a first signal;
processing an imaginary component of the output signal of the carrier tracking loop for providing a second signal;
delaying the real component of the output signal of the carrier tracking loop for providing a delayed real component;
delaying the imaginary component of the output signal of the carrier tracking loop for providing a delayed imaginary component; and
providing a difference signal representative of a difference between the first signal and the delayed imaginary component;
providing a sum signal representative of a sum of the delayed real component and the second signal; and
multiplying the difference signal and the sum signal for providing an output signal for driving the phase lock loop.

11. The method of claim 10, wherein each processing step performs Hilbert-type filtering.

12. The method of claim 11, wherein the Hilbert-type filtering is a pseudo-Hilbert filtering.

13. The method of claim 7, wherein the received signal is an ATSC (Advanced Television Systems Committee) VSB (Vestigial Sideband) modulation signal and the method includes downconverting the received ATSC VSB modulation signal.

14. Apparatus for use in a carrier tracking loop, the apparatus comprising:
a phase lock loop configured to perform tracking of a carrier in a received signal to provide a downconverted received signal, wherein the phase lock loop comprises a detector configured to use energy from both band edges of the received signal to drive the phase lock loop; and
a delay and/Hilbert filter element coupled to the received signal, wherein the phase lock loop de-rotates an output signal of the delay and/Hilbert filter element to provide the downconverted received signal.

15. A method for use in a carrier tracking loop, the method comprising:
performing tracking of a carrier in a received signal with a phase lock loop for providing a downconverted received signal;
driving the phase lock loop as a function of detected energy from both band edges of the received signal; and
processing the received signal with a delay and/Hilbert filter element, wherein the phase lock loop de-rotates an output signal of the delay and Hilbert filter element for providing the downconverted received signal.

* * * * *